United States Patent [19]

Love

[11] Patent Number: 5,012,226
[45] Date of Patent: Apr. 30, 1991

[54] SAFETY ALERTNESS MONITORING SYSTEM

[76] Inventor: Samuel D. Love, 13510 Old Indian Head Rd., Brandywine, Md. 20613

[21] Appl. No.: 483,635

[22] Filed: Feb. 23, 1990

[51] Int. Cl.$^5$ .............. G08B 23/00; B60Q 1/00; H01H 47/00
[52] U.S. Cl. .................. 340/576; 180/272; 340/309.15; 340/439; 361/170
[58] Field of Search ............ 340/576, 309.15, 439; 180/272; 361/170; 368/244, 250, 261-263

[56] References Cited

U.S. PATENT DOCUMENTS

| | | | |
|---|---|---|---|
| 3,611,344 | 10/1971 | Couper | 340/279 |
| 3,686,878 | 8/1972 | Patrick et al. | 368/263 |
| 3,778,116 | 12/1973 | Kennedy | 303/19 |
| 3,922,665 | 11/1975 | Curry et al. | 340/279 |
| 3,947,815 | 3/1976 | Muncheryan | 340/576 X |
| 3,953,831 | 4/1976 | Estrada | 340/53 |
| 4,234,051 | 11/1980 | Morris, Jr. | 180/272 |
| 4,332,019 | 5/1982 | Lynches | 368/250 X |
| 4,359,725 | 11/1982 | Balogh et al. | 340/576 |
| 4,379,641 | 4/1983 | Maezawa et al. | 368/261 X |
| 4,616,208 | 10/1986 | Nakamura | 340/309.15 |
| 4,659,233 | 4/1987 | Nakamura et al. | 368/261 X |
| 4,681,465 | 7/1987 | Nakamura et al. | 368/261 X |
| 4,879,542 | 11/1989 | Elsey | 340/576 X |

FOREIGN PATENT DOCUMENTS

3315545 11/1983 Fed. Rep. of Germany ...... 368/261

Primary Examiner—Glen R. Swann, III
Assistant Examiner—Thomas J. Mullen, Jr.
Attorney, Agent, or Firm—Oliff & Berridge

[57] ABSTRACT

The present invention utilizes operator interaction for maintaining an operator alert. A switching means is provided which must be actuated by the operator within an adjustable time period to prevent a first alarm from being activated. Upon detection of this first alarm, the driver must actuate the switching means, indicating his alertness and restarting the first time period, otherwise after expiration of a second time period a second alarm will be activated to further alert the operator and passengers. This second alarm will remain activated until the switching means is actuated restarting the process. The present invention also includes a waiting mode whereby the timer can be deactivated while driving in congested traffic. During the waiting mode, a third alarm is activated to provide some alerting function. The present invention can be portable and thus easily used and installed in different vehicles. A variety of mounting means can be used to mount the device in the vehicle. The device also includes a first electrical output which is usually ON, but is turned OFF when the buzzer sounds. This output can be used to supply power to, for example, games for the enjoyment by children. Since the drive in effect "controls" the power supplied to the first output, additional interaction of passengers with the driver is ensured, thus further raising the alertness of the driver. A second electrical output is provided which is usually OFF, but is turned ON when the buzzer sounds. The second output can be used to control additional safety devices.

42 Claims, 5 Drawing Sheets

SAFETY ALERTNESS MONITORING SYSTEM

BACKGROUND OF THE INVENTION

1. Field of the Invention

The present invention relates to an apparatus for maintaining a high level of alertness in vehicle operators, and particularly to such apparatus which can also maintain a high level of alertness of all occupants of a vehicle.

2. Description of the Related Art

A high percentage of serious vehicle accidents are due to driver alertness impairment caused by, for example, sleep, fatigue, substance abuse and illnesses. Many of these accidents could have been prevented if an adequate device was available for maintaining a high level of alertness in the vehicle operator. While a number of patents exist for driver alertness devices, none of these patented devices appear to be available to the consumer, due perhaps to impracticalities of these devices, the apparent resistance of the automobile industry in incorporating such devices into vehicles or the inability of individual consumers to self-install these devices.

U.S. Pat. No. 3,611,344 to Couper discloses a reaction actuator for vehicle operators used for initiating conscious activity of a vehicle operator. The system utilizes a visual alarm signal which is automatically and periodically actuated. The signal must be promptly manually deactivated by the operator to prevent simultaneous actuation of external emergency flashing lights, automobile horn and engine deactivator. A floor switch is provided in the drive compartment of a vehicle for manual deactivation of the system. A time delay unit is also provided in the system which allows a time delay of 10–120 seconds. The system disclosed by the '344 patent is not a self-contained unit but must be wired into the automobile power supply, emergency flasher system, ignition system and/or throttle.

U.S Pat. No. 3,778,116 to Kennedy discloses a safety device which requires periodic attention of vehicle operators. Completion of a first timing cycle initiates a second timing cycle during which a warning device alerts an operator. Normal actuation of a reset switch by the operator before completion of the second timing cycle prevents energization of a solenoid. The solenoid controls an air brake system which is automatically engaged upon completion of a second timing cycle. The system disclosed by the '166 patent is also not self-contained but must be wired into the vehicle's power supply and brake system.

U.S. Pat. No. 4,234,051 to Morris, Jr. discloses a driver alertness device which includes a timing counter which decrements from a set time towards zero. When the timer reaches zero, a solenoid is energized to urge a throttle to an idle position. A reset button is manually operable by the driver of the vehicle which adds a predetermined amount of time to the timer for each push of a reset button. An on/off switch is also accessible to a driver for turning on or off the device. The device disclosed in the '051 patent is not self-contained, but must be wired into the vehicle's power supply and throttle systems. Additionally, the device of the '051 patent requires a vehicle operator to read and interpret a numeric display which can be overly distracting.

U.S. Pat. No. 3,953,831 to Estrada discloses an alarm system for use with a cigarette lighter receptacle of a vehicle. The system actuates an alarm and stops the engine of a vehicle when the vehicle driver starts to dose or fall asleep. This system includes a switch attachable to the head of a driver, the switch being coupled to a cable having a plug for insertion into a conventional cigarette lighter receptacle. A light flasher, a relay coil and a buzzer are electrically coupled to the receptacle and are energized simultaneously when a mercury switch closes upon movement of the head of the driver. The device disclosed in the '831 patent, while being attachable to a conventional cigarette lighter receptacle, requires a light flasher, relay coil and buzzer to be electrically coupled to the receptacle.

OBJECTS OF THE INVENTION

It is an object of the present invention to provide a safety alertness monitoring device which generates and maintains a high level of alertness among all occupants of a motor vehicle.

It is another object of the present invention to provide a safety alertness monitoring device which is self-contained enabling purchase thereof in the automobile after-market, easy installation and use in a plurality of vehicles.

It is another object of the present invention to provide a device which can be operated in a waiting-mode whereby driver interaction is not required but a more limited alertness function is still achieved.

It is another object of the invention to provide a safety alertness monitoring system which also provides additional power outlets for optionally controlling additional safety devices.

It is a further object of the present invention to provide a safety alertness monitoring system which can also function as a timed power source for providing power to operate other devices such as games.

SUMMARY OF THE INVENTION

The present invention utilizes operator interaction for maintaining an operator alert. A switching means is provided which must be actuated by the operator within an adjustable time period to prevent a first alarm from being activated. Upon detection of this first alarm, the driver must actuate the switching means, indicating his alertness and restarting the first time period, otherwise after expiration of a second time period a second alarm will be activated to further alert the operator and passengers. This second alarm will remain activated until the switching means is actuated restarting the process. The present invention also includes a waiting mode whereby the timer can be deactivated, for example, while driving in congested traffic. During the waiting mode, a third alarm is activated to provide some alerting function. The present invention can be portable and thus easily used and installed in different vehicles. A variety of mounting means can be used to mount the device in the vehicle. The device also includes a first electrical output which is usually ON, but is turned OFF when the buzzer sounds. This output can be used to supply power to, for example, games for the enjoyment by children. Since the driver in effect "controls" the power supplied to the first output, additional interaction of passengers with the driver is ensured, thus further raising the alertness of the driver. A second electrical output is provided which is usually OFF, but is turned ON when the buzzer sounds. The second output can be used to control additional safety devices.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

Figure 1A:
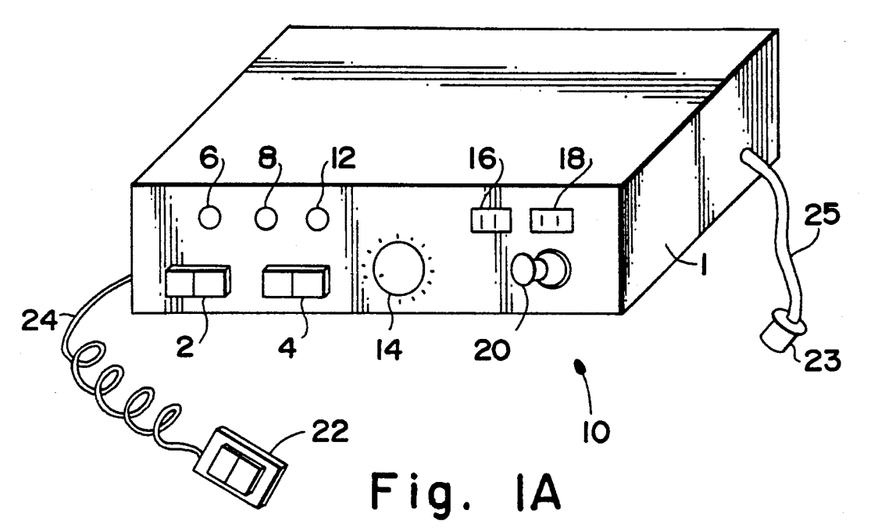
FIGS. 1A and 1B are isomeric views of two embodiments of the safety alertness monitoring system of the present invention.
Figure 1B:
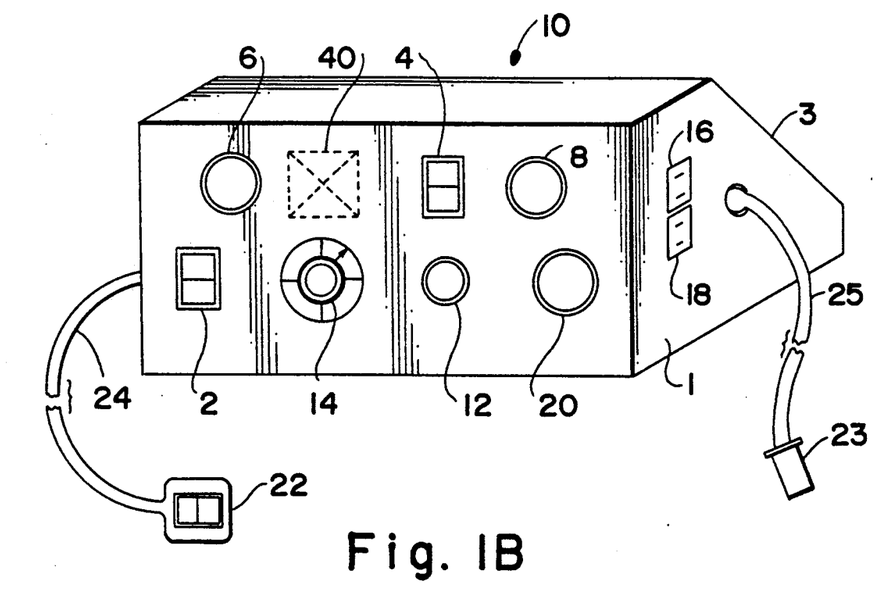

FIGS. 1A and 1B show preferred embodiments of a safety alertness monitoring system 10 of the present invention. The embodiments of FIG. 1A and FIG. 1B differ from each other in the arrangement of components on the housing and in the shape of the housing. Particularly, the rear section 3 of housing 1 in FIG. 1B is tapered to reduce the overall size of the device and, more importantly, to facilitate placement of device 10 on a vehicle dashboard alongside the windshield or under the dashboard atop the transmission housing. The safety alertness monitoring system 10 includes an outer housing 1 which contains the internal components, to be discussed later, of the system. The front face of the safety alertness monitoring system 10 includes three lights 6, 8 and 12 which function to inform the user of the various conditions of the safety alertness monitoring system 10. Specifically, light 6 is a flashing waiting light which indicates that the system is in a "waiting mode", light 8 is a flashing timing light which indicates that a first predetermined time period of the "timing mode" has been counted and light 12 is a pilot light which indicates that the system is in the "timing mode". The system also includes an alarm 40 (shown in FIGS. 1B and 4) which is operative after a second predetermined time period of the "timing mode" has expired. Power is provided to the system illustrated in FIGS. 1A and 1B by plug 23 which can be inserted into a standard vehicle cigarette lighter. Plug 23 is attached to the internal components of the device by cord 25. The front panel of housing 1 also includes an on/off switch 2 for providing power to the system and an optional on/off switch 4 which can be used to prevent light 8 from flashing. Dial 14 is provided for setting the predetermined time periods which will be discussed below. Housing 1 also includes an on/off receptacle 18, an off/on receptacle 16 (both of which will be discussed below) and, optionally, a cigarette lighter 20. Switch 22 is provided for actuation by an operator of the vehicle and is attached to housing 1 by cord 24. Cords 24 and 25 can be stretch-type cords so that they take up a minimal amount of space in the vehicle compartment.

Figure 2A:
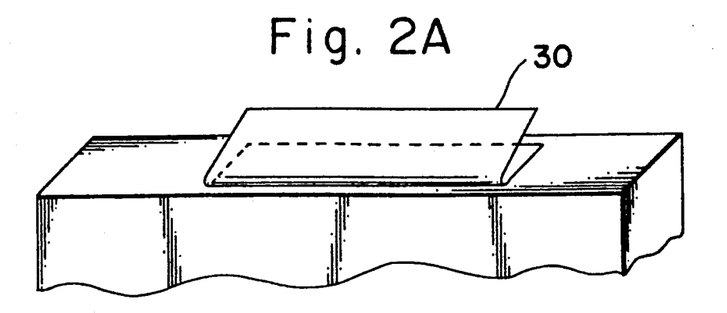
FIGS. 2A, 2B and 2C are three alternative embodiments of mounting structures usable with the present invention.
Figure 2B:
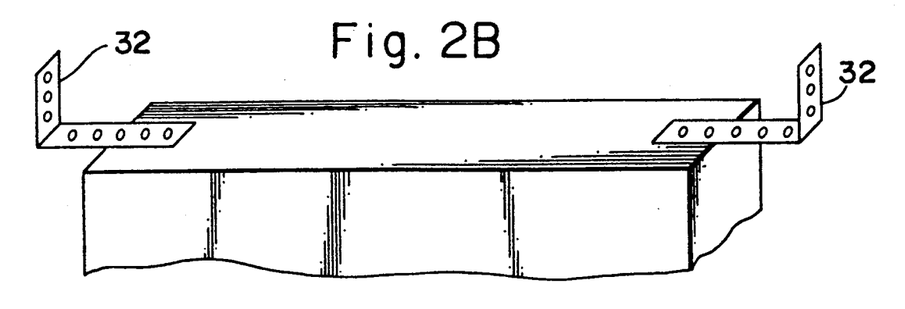
Figure 2C:
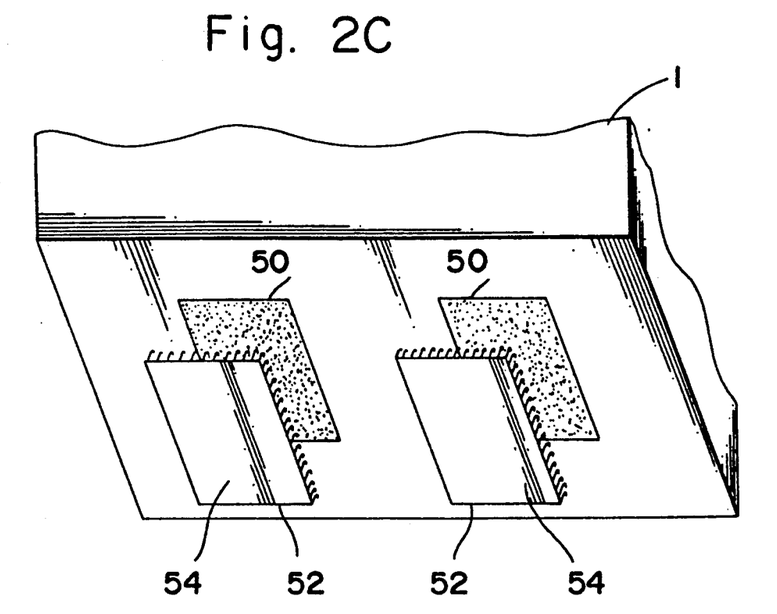

An advantage of the present invention resides in its ability to be easily installed in any vehicle. Thus, a vehicle operator who desires to use the safety alertness monitoring system 10 need not rely on the automobile manufacturer or any other person to install the system in a vehicle, but can simply purchase the safety alertness monitoring system and begin using it by inserting plug 23 into a standard cigarette lighter. The system need not use any of the vehicle's own components as alarms and therefore can be easily used in a number of vehicles. Although housing 1 can simply be placed on the front seat of the car, the glove compartment or on the dashboard, additional mounting structure, illustrated in FIGS. 2A, 2B and 2C, can also be used with the present invention. FIG. 2A shows a clip 30 for clipping housing 1 on, for example, a standard sun visor provided in all vehicles. FIG. 2B shows a set of brackets 32 which can be used for mounting housing 1 underneath the dashboard. FIG. 2C shows an embodiment wherein VELCRO hook-and-loop-type fasteners 50,52 are used to mount housing 1 to, for example, the upper surface of a vehicle dashboard. The embodiment of FIG. 2C includes a first set of fasteners 50 and a second set of fasteners 52 which are attached to housing 1 and a vehicle dashboard, respectively, by, for example, adhesive which can be provided on a base surface 54 of the fasteners. It is understood that a single or plurality of mounting fasteners 50,52 can be provided and that these fasteners can be provided in various colors to match the interior color of the vehicle. Alternatively, a VELCRO harness can be provided which removably holds the safety alertness monitoring system 10 and mates with corresponding VELCRO patches that may be attached to selected locations within the vehicle. Similarly, various other mounting structures can be used for removably mounting the safety alertness monitoring system in the internal compartment of a vehicle.

Figure 3A:
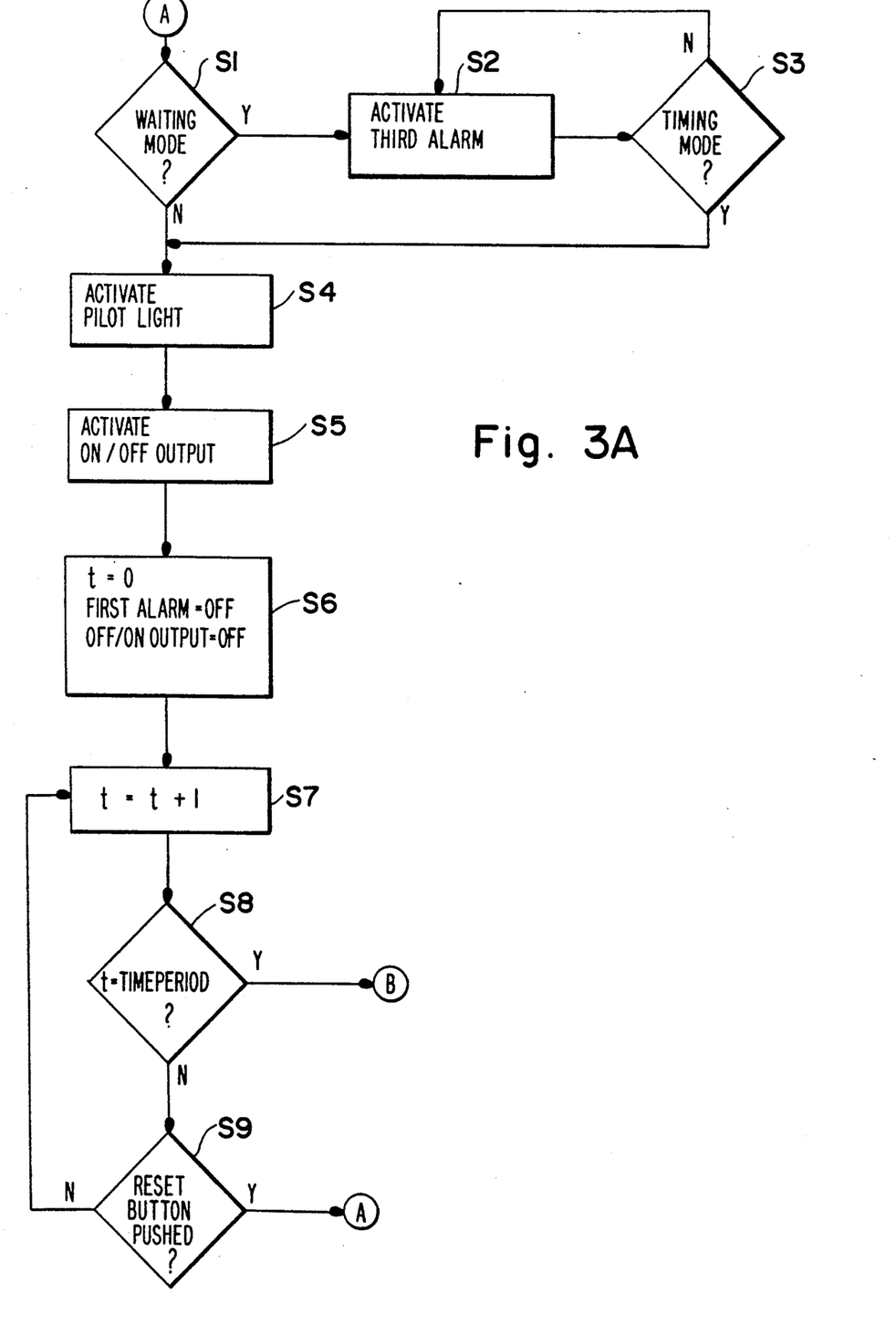
FIGS. 3A and 3B are a schematic block diagram circuit for a safety alertness monitoring system of the present invention.
Figure 3B:
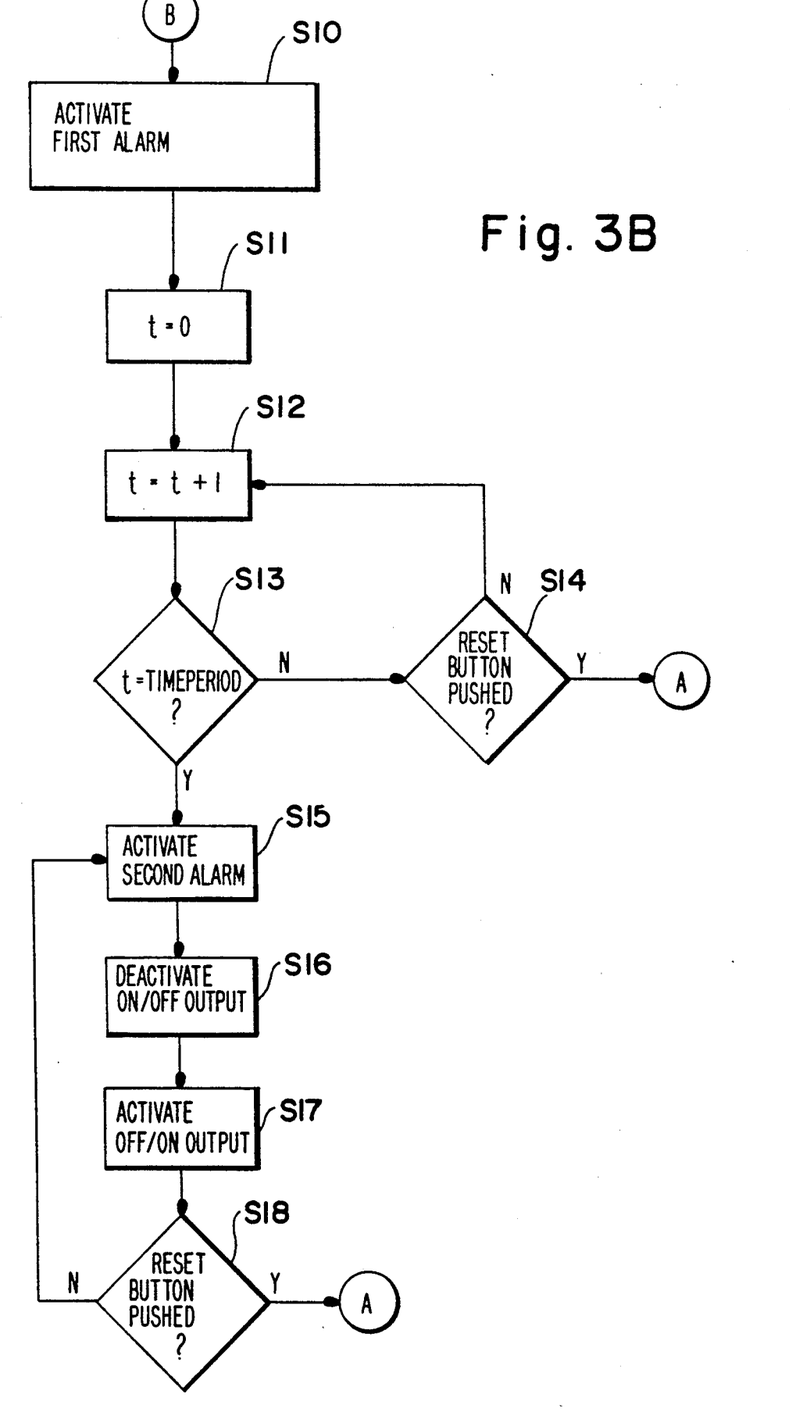

FIGS. 3A-3B illustrate a schematic block diagram circuit for the safety alertness monitoring system 10 of the present invention. In step 1 (S1), it is determined whether the system is in the "waiting mode". If the system is in the "waiting mode" waiting light 6 is activated in S2. The "waiting mode" can be used under several conditions. The more important uses are (a) for momentarily shutting off and recycling the "timing mode" (to be described below); (b) as an alternative to using the power shut off switch 2 when the motor vehicle is standing at traffic lights or other brief stops when the "timing mode" is not desired to be used; and (c) to defer the involvement of the "timing mode" while driving in congested traffic, yet maintaining the alerting function of the safety alertness monitoring system by providing the flashing of light 6. Thus, an alarm or alertness function is provided by flashing light 6, although the level of alertness provided by the "waiting mode" is less than that provided by the "timing mode" because no operator interaction is required to prevent further alertness functions from occurring. In S3, a determination is made as to whether the system is in the "timing mode", for example, by determining whether switch 22 has been actuated. The system remains in the "waiting mode" until switch 22 has been actuated.

Once in the "timing mode" pilot light 12 is lighted (S4), on/off output 18 is supplied with power (S5) and the timer is initialized (S6). In the "timing mode" alert light 8 and off/on output 16 are initially not supplied with power. The timer 38 (see FIG. 4) is set to zero and begins to count the first predetermined time period. The first predetermined time period can be adjustably set by dial 14. As long as timer 38 does not count to the first predetermined time period, and a reset button (which can correspond to switch 22) is not actuated, the value counted by the timer is incremented (S7). If it is determined in S9 that the reset button has been pushed the safety alertness monitoring system 10 returns to the waiting mode and the entire procedure begins again. In the preferred embodiment, where switch 22 is an on/on double-pole rocker switch, a first position of the switch actuates the "waiting mode" and a second position of the switch actuates the "timing mode". Thus, once in the "timing mode" an operator is required to move switch 22 to the first position which actuates the "waiting mode" and then immediately move switch 22 to the second position to restart the "timing mode". After a very short period of time, an operator will become accustomed to the rhythm of sequentially moving switch 22 between the second and first positions to repeatedly reset timer 38 and prevent the first predetermined time period from being counted by the timer 38.

If the first predetermined time period is determined to be counted in S8 by timer 38, the system proceeds to S10 whereby a first alarm is activated. In the preferred embodiment, the first alarm is a flashing alert light 8. At this time a second predetermined time period begins to be counted. In the preferred embodiment, timer 38 is a two-phase timer which counts a first predetermined time period followed by a second predetermined time period equal to the first predetermined time period. However, it is apparent that two separate timers having separate adjustments could also be used to count the first and second predetermined time periods, respectively. In S11 the second predetermined time period is initialized and in S12 the value of the timer is incremented until either the second predetermined time period is determined to have been counted in S13 or a reset button (which corresponds to switch 22 in the preferred embodiment) is determined to have been actuated in S14. If the reset button is pushed, the system switches back to the waiting mode as in S9. When the second time period is determined to have been counted by timer 38 in S13, a second alarm (buzzer 40 in the preferred embodiment) is actuated (S15), on/off output 18 is deactivated (S16) and off/on output 16 is activated (S17). This state continues until reset button is actuated in S18.

It is likely that the sounding of buzzer 40 should inform the vehicle operator and passengers of the deteriorating alertness of the vehicle operator so that appropriate corrective measures can be taken. However, it is also possible to power additional actuating devices, such as relays, from off/on output 16, which actuation devices could actuate vehicle components such as the brakes, windshield wipers or emergency flashers, or deactivate the throttle. Although these additional actuation devices require installation of components, such as relays, into the vehicle's electrical system the safety alertness monitoring system 10 of the present invention remains portable because the power supplied to these additional actuation devices comes from the off/on output 16 from which the additional actuation devices can be easily disconnected.

Figure 4:
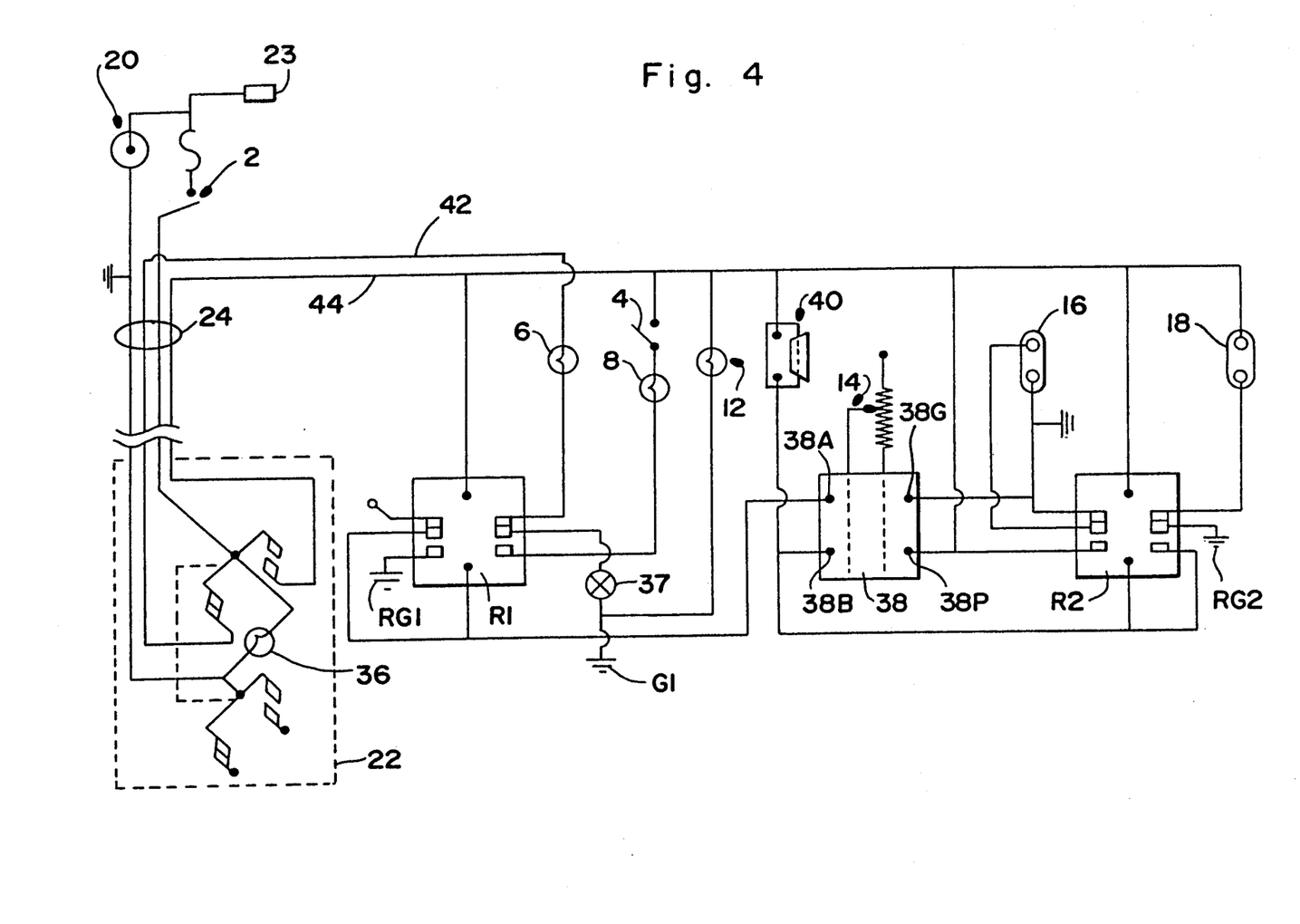
FIG. 4 is a circuit diagram of one form of timing circuit of the present invention.

FIG. 4 illustrates a circuit diagram of one form of timing circuit usable in the present invention. Switch 22 is an on/on double pole rocker switch which is supplied with power from, for example, a vehicle's cigarette lighter (not shown) and provides power to hot wires 42 and 44 when in first and second positions, respectively. Rocker switch 22 also includes a light 36 which enables switch 22 to be easily located in the compartment of a vehicle regardless of the external lighting conditions. When in the first position, power is supplied to hot wire 42 and light 6 is actuated. A flasher 37 is provided in series with light 6 via a relay R1 so that the light 6 will flash. Relay R1 maintains flasher 37 in series with light 6 when the relay R1 is in a deactivated state. When in the second position, the "timing mode" is initialized and power is no longer supplied to hot wire 42. Upon initialization of the "timing mode" pilot light 12 is actuated and power is supplied to timer 38 through its positive terminal 38P. Timer 38 is connected to ground through its internal ground 38G. When in the "timing mode" the system operates by having timer 38 activate relays R1 and R2 after counting first and second predetermined time periods, respectively. Once placed in the "timing mode", timer 38 increments its value unless it is reset by an operator moving switch 22 to its first position which cuts off the power to hot wire 44 and resets timer 38. After counting a first predetermined time period, timer 38 attaches relay R1 to ground by closing a gate between terminal 38A and internal ground 38G. At this time, relay R1 becomes activated whereby relay R1 is permanently grounded through ground RG1 and alert light 8 is communicated with flasher 37 and ground G1. Thus, after counting the first predetermined time period, alert light 8 will begin to flash. The circuit including alert light 8 also includes an optional switch 4 which can be opened if, for example, the vehicle operator does not want to disturb sleeping passengers in the vehicle with the flashing alert light 8. However, the alarm function is still achieved since the movement of relay R1 to the activated position can be heard by the vehicle operator.

If the vehicle operator does not actuate switch 22 in response to either seeing flashing light 8 or hearing relay R1, timer 38 begins counting the second predetermined time period. When the second predetermined time period has been counted, terminal 38B and internal ground 38G are connected, thus grounding relay R2. When grounded, relay R2 becomes activated so that it is placed in contact with permanent ground RG2, on/off output 18 is deactivated, buzzer 40 sounds and off/on output 16 is activated. The system will remain in this state until switch 22 is actuated.

The safety alertness monitoring system presents to the motor vehicle public a positive device for establishing and maintaining a higher degree of alertness for drivers. This is accomplished by a combination of alerting functions and subtle responses involved in operating the device. This action-response system can very well enhance the driver's normal alertness level In addition to that factor, the action-response combination will cause the driver's lack of alertness to be known by other passengers in the vehicle. Soon after drivers operate this timing device, they develop a rhythm of the timing cycle and press the control switch in some selected time frame. An alert driver can maintain that rhythm or even change the rhythm or the cycle, yet maintain consistency of operation for long periods of time. However, when the driver's alertness starts to deteriorate, the rhythm of the switching becomes obvious to alert passengers, if not to the driver. In this way the passengers will obtain notice of the driver's condition, much in advance of any such information obtained by other means. This information can prompt a change in drivers or closer monitoring of the same driver. Hopefully, the action taken will prevent a motor vehicle accident.

The provision of on/off output 18 enables the safety alertness monitoring system to be used as a power base for supplying power to, for example, games usable by passengers, especially children. However, since on/off output 18 is deactivated upon expiration of the second predetermined time period, the users of the games will be made aware of the driver's lack of alertness, enabling them to take appropriate actions regarding the alertness of the driver. Additionally, off/on output 16 is provided for the attachment of additional alarms or devices intended to be activated upon the expiration of the second predetermined time period. For example, devices for triggering the brakes, lights, horns, sirens, or relays controlling other devices can be attached to output 16.

While plug 23 for insertion into a cigarette lighter is described, other connectors which allow for easy connection and disconnection from the vehicle's power supply and thus portability of the device can also be provided. Additionally, alarms other than the above-described flashing lights and buzzers can be substituted for light 6 and 8 and buzzer 40. Furthermore, while an on/on double pole rocker switch is described, other switches can be used including separate switches for activating the "waiting mode" and "timing mode", respectively, however the above-described switch is preferable because it enables the entire device to be operated from a single switch which can be easily held in the hand of an operator while driving.

Lenses (not shown) can also be provided over lights 6, 8 and 12 for protecting users of the device from being injured by hot or broken lights, to protect the lights from being damaged and to enable users of the present invention to vary the colors provided by lights 6, 8 and 12 as needed. In this manner, more light can be provided, for example, in the day time and less at night. These lenses can be removably attached to the outer surface of housing 1 over lights 6, 8 and 12.

Although a specific example is disclosed, the present invention is applicable to other types of safety alertness monitoring systems. Accordingly, the preferred embodiments of the invention as set forth herein are intended to be illustrative, not limiting. Various changes may be made without departing from the spirit and scope of the invention as defined in the following claims.

What is claimed is:
1. A safety alertness monitoring system comprising:
   a housing;
   timer means located in said housing, for counting a first predetermined time period and a second predetermined time period after counting said first predetermined time period;
   first alarm means, located in said housing, for sounding a first alarm after said first predetermined time period is counted by said timer means;
   second alarm means, located in said housing, for sounding a second alarm after said second predetermined time period is counted by said timer means;
   resetting means for resetting said timer means, said resetting means causing said timer means to begin counting said first predetermined time period when actuated; and
   attaching means for removably attaching said system to a power supply whereby said system is portable.
2. The system according to claim 1, wherein said attaching means includes a connector for removably attaching said system to a vehicle power supply.
3. The system according to claim 1, whereby said attaching means is a plug engageable with a vehicle's cigarette lighter.
4. The system according to claim 1, wherein said resetting means is a switch movable between first and second positions, said first position designating a timing mode of said apparatus wherein said timer means is activated and begins counting said first predetermined time period, said second position designating a waiting mode wherein said timer means is deactivated and reset.
5. The system according to claim 4, further comprising a third alarm, said third alarm being activated when said switch is in said second position.
6. The system according to claim 5, wherein said first alarm is a first flashing light, said second alarm is a buzzer and said third alarm is a second flashing light.
7. The system according to claim 1, further comprising an on/off receptacle located on said housing, said on/off receptacle being supplied with power when said timer means is counting said first and second predetermined time periods.
8. The system according to claim 1, further comprising an off/on receptacle located on said housing, said off/on receptacle being supplied with power only after said second predetermined time period is counted.
9. The system according to claim 1, wherein said timer means is a two-phase timer.
10. The system according to claim 1, wherein said timer means includes setting means for adjustably setting the first and second predetermined time periods.
11. The system according to claim 1, wherein said first alarm means includes a flashing light and a switch for selectively shutting off power to said flashing light.
12. The system according to claim 1, further comprising a first relay having activated and deactivated positions, said first relay being activated by said timer means after said first time period is counted and being deactivated when said resetting means is actuated, said first relay closing a first circuit to supply said first alarm means with power when activated and opening said first circuit when deactivated.
13. The system according to claim 12, further comprising a second relay having activated and deactivated positions, said second relay being activated by said timer means after said second predetermined time period is counted and being deactivated when said resetting means is actuated, said second relay completing a second circuit to supply said second alarm means with power when activated and opening said second circuit when deactivated.
14. The system according to claim 1, further comprising mounting means for removably mounting said housing in a vehicle.
15. The system according to claim 14, wherein said mounting means includes a bracket.
16. The system according to claim 14, wherein said mounting means includes a clip.
17. The system according to claim 14, wherein said mounting means includes a hook-and-loop fastener wherein one of a hook fastener and a loop fastener is attached to said housing and the other of said hook fastener and said loop fastener is attachable to a surface in an internal compartment of a vehicle.
18. The system according to claim 1, wherein said resetting means includes a switch which is separate from said housing and operatively attached to said timer means by a cord.
19. The system according to claim 1, wherein said housing includes a tapered upper surface.
20. A safety alertness monitoring system comprising:
    timer means for counting a first predetermined time period and a second predetermined time period after counting said first predetermined time period;

first alarm means for sounding a first alarm after said first predetermined time period is counted by said timer means;

second alarm means for sounding a second alarm after said second predetermined time period is counted by said timer means;

a third alarm; and a switch movable between first and second positions, said first position designating a timing mode of said apparatus wherein said timer means is activated and begins counting said first predetermined time period, said second position designating a waiting mode wherein said timer means is deactivated and reset and said third alarm is activated.

21. The system according to claim 20, wherein said first alarm is a first flashing light, said second alarm is a buzzer and said third alarm is a second flashing light.

22. The system according to claim 20, further comprising a first relay having activated and deactivated positions, said first relay being activated by said timer means after said first predetermined time period is counted and being deactivated when said switch is moved to said second position, said first relay completing a first circuit to supply said first alarm means with power when activated and opening said first circuit when deactivated.

23. The system according to claim 22, wherein said first relay closes a waiting circuit which includes said third alarm means when said first relay is deactivated and said switch is in said second position.

24. The system according to claim 22, further comprising a second relay having activated and deactivated positions, said second relay being activated by said timer means after said second predetermined time period is counted and being deactivated when said resetting means is actuated, said second relay completing a second circuit to supply said second alarm means with power when activated and opening said second circuit when deactivated.

25. The system according to claim 20, further comprising an on/off receptacle, said on/off receptacle being supplied with power when said switch is in said first position and said timer is counting said first and second predetermined time periods.

26. The system according to claim 20, further comprising an off/on receptacle, said off/on receptacle being supplied with power only when said switch is in said first position and after said second predetermined time period is counted.

27. The system according to claim 20, wherein said timer means is a two-phase timer.

28. The system according to claim 20, wherein said timer means includes setting means for adjustably setting the first and second predetermined time periods.

29. A safety alertness monitoring system comprising:
a housing;
timer means, located in said housing, for counting a first predetermined time period and a second predetermined time period after counting said first predetermined time period;
a first alarm located in said housing;
a second alarm located in said housing;
a third alarm located in said housing;
attaching means including a connector for removably attaching said system to a power supply;
signalling means for supplying first and second signals; and
control means, located inside said housing, said control means selectively connecting said attaching means to said timer means and said first, second and third alarms based on said first and second signals, wherein said control means causes said timer means to begin counting said first predetermined time period upon receipt of said first signal and resets said timer means upon receipt of said second signal, said control means attaching said first alarm to said attaching means after said first predetermined time period is counted, connecting said second alarm to said attaching means after said second predetermined time period is counted and connecting said third alarm to said attaching means upon receipt of said second signal.

30. The system according to claim 29, wherein said control means includes a first relay having activated and deactivated positions, said first relay being activated after said first predetermined time period is counted and being deactivated upon receipt of said second signal, said first relay closing a first circuit which includes said first alarm when activated.

31. The system according to claim 30, wherein said control means includes a second relay having activated and deactivated positions, said second relay being activated after said second predetermined time period is counted and being deactivated upon receipt of said second signal, said second relay closing a second circuit which includes said second alarm when activated.

32. The system according to claim 31, further comprising an on/off receptacle, located in said housing, wherein said control means connects said on/off receptacle to said attaching means upon receipt of said first signal and disconnects said on/off receptacle from said attaching means after said second predetermined time period is counted.

33. The system according to claim 32, wherein said second relay attaches said on/off receptacle to said attaching means when deactivated and disconnects said on/off receptacle from said attaching means when activated.

34. The system according to claim 29, wherein said connector is for removably attaching said apparatus to a vehicle power supply.

35. The system according to claim 34, wherein said connector is a plug engageable with a vehicle's cigarette lighter.

36. The system according to claim 29, wherein said first alarm is a first flashing light, said second alarm is a buzzer and said third alarm is a second flashing light.

37. The system according to claim 29, wherein said timer means is a two-phase timer.

38. The system according to claim 29, wherein said timer means includes setting means for adjustably setting the first and second predetermined time periods.

39. The system according to claim 29, further comprising mounting means for removably mounting said housing in a vehicle.

40. The system according to claim 1, wherein said second alarm is separate from said first alarm.

41. The system according to claim 20, wherein said second alarm is separate from said first alarm.

42. The system according to claim 29, wherein said second alarm is separate from said first alarm.

* * * * *